Patented Oct. 22, 1935

2,018,161

UNITED STATES PATENT OFFICE 2,018,161

TREATMENT OF HYDROCARBON OILS

Harold C. Weber, Milton, Mass., assignor to Universal Oil Products Company, Chicago, Ill., a corporation of South Dakota No Drawing. Application November 3, 1930, Serial No. 493,247

2 Claims. (Cl. 204—31)

This invention relates to the treatment of hydrocarbon oils, and refers more particularly to a catalytic material suitable for the conversion of hydrocarbon oils. In a specific embodiment of the invention, a specially prepared catalytic material is used for the hydrogenation of hydrocarbon oils.

It is well known in the use of catalysts that the degree of dispersion or state of subdivision is an important factor in the effectiveness of the catalysts. The catalysts used in connection with my invention are prepared by causing an oscillating electrical discharge, preferably of radio frequency, to pass between the electrodes. During the preparation of the catalysts, the electrodes are preferably submerged beneath the surface of the hydrocarbon oil undergoing treatment, and hydrogen gas is passed through the discharge, causing the hydrocarbon oils, or their products of conversion, to be hydrogenated.

During the passage of the current, not only is a catalyst of the desired type formed, but in addition hydrogenation is promoted by the oscillating electrical discharge, particularly of a frequency falling within the range of radio frequency.

The catalyst made during the process is highly active because of its form and high degree of dispersion. In addition, the hydrogen itself is activated due to its passage through or near the high frequency discharge.

As examples of the materials of which the electrodes may be composed, I may cite various metals such as zinc, tin, copper, aluminum, iron, nickel, silver, cobalt, chromium, as well as the alkaline metals, sodium and potassium, and the alkaline earth metals, calcium, magnesium, barium and strontium. The noble metals, including gold, platinum, palladium, iridium, indium and osmium, are particularly effective in the process of my invention. In some cases it has been found desirable to add catalysts in addition to those formed during the process, and it has also been found desirable in promoting reactions generally with the hydrocarbon oils to add other substances, such as oxygen, steam, chlorine, bromine, alcohol, acetone and aldehydes, those normally liquids being introduced preferably in the vapor state. When these last mentioned reacting materials are added, either alone or in mixture, the selection depends upon the particular reactions desired.

The process may be carried out at various temperatures and pressures, including those from atmospheric and upwardly to those of high superatmospheric pressure and at conversion temperatures wherein the hydrocarbons may be converted into lower boiling products in addition to reaction with the extraneously introduced materials. The conditions of treatment are likewise selected depending upon the products desired as well as economic conditions generally.

My process may be operated at atmospheric, sub-atmospheric or super-atmospheric pressures, the choice depending upon the products desired as well as the yield, and upon other conditions such as temperature, type of catalysts and the particular reaction involved.

In my process, one may use hydrocarbons as raw materials which are deficient in hydrogen, for example those of a more or less pitchy or asphaltic character which may include various tars such as those obtained from wood, lignite, peat, coal, oil shales and the like, or hydrocarbon residues either from the atmospheric distillation of petroleum or the residues resulting from a previous cracking operation; or mixtures similar in general character to the above named materials such as mixtures of hydrocarbons and pitches or coal have been found suitable for treatment by the process of my invention. Improved results can be obtained by the application of the invention in the conversion of hydrocarbons of any character, which includes distillates as well as residual oils, substantially reducing the formation of heavy residues and increasing the yields of lower boiling products, for example those suitable for motor fuel. In all cases involving hydrogenation the increased yield depends on the characteristics of the material undergoing treatment, the catalysts and the amount of hydrogen introduced. The process is also applicable to the production of suitable charging stocks for subsequent treatment under conversion conditions of temperatures and/or pressures, an example of which is the hydrogenation of a very viscous and heavy cracking residue to produce a cracking stock which, upon subsequent treatment, greatly increases the yield of low boiling products obtained by the process.

As a specific example of the operation of the process of my invention, an oscillating electrical discharge of a frequency of 1,000,000 cycles was passed between pairs of electrodes arranged so that hydrocarbon oil undergoing treatment was caused to pass through the discharge. Nickel electrodes were used for this purpose, the electrode being gradually dispersed throughout the oil undergoing treatment, the dispersed metal acting as a catalyst for the hydrogenation of the oil undergoing treatment. Hydrogen is introduced from an external source using approximately 10% by weight of the oil undergoing treatment for oils of approximately 24 A. P. I. gravity, and approximately 20% for oils of approximately 16 A. P. I. gravity. The excess hydrogen is recovered. At temperatures below those at which substantial cracking occurs, the oil undergoing treatment is directly hydrogenated and produces a superior cracking stock. At higher temperatures exceeding those at which substantial cracking occurs, hydrogenation of the charging oil, as well as of the products, occurs, thereby increasing the yields of low boiling products as well as the total liquid recovery.

The preparation of the select charging stock was carried out at approximately 500° to 750° F. A cracked residuum thus treated gave high yields of low boiling hydrocarbons suitable for motor fuels when later subjected to cracking conditions. Simultaneous cracking and hydrogenation were effected at temperatures ranging from 750° to 1000° F. Pressures of several hundred to several thousand pounds per square inch gave good results with increasing hydrogenation per unit time at the higher pressures.

It may be understood from the foregoing that the process is capable of many modifications and variations in regard to hydrocarbon materials to be treated and conditions of treatment, and it is desired that the examples given are to be construed as illustrative only and not as limitations upon the broad scope of the invention.

I claim as my invention:

1. A process for treating liquid hydrocarbon oil in liquid phase which comprises immersing in the liquid oil a pair of electrodes at least one of which is made of a catalytic metal, passing a radio frequency current between said electrodes whereby the catalytic metal is dispersed in finely divided form throughout the liquid, contacting hydrogen with the oil, simultaneously subjecting the oil to cracking conditions of temperature and pressure and maintaining a body of hydrocarbon liquid being hydrogenated as a dispersing medium for the catalytic material.

2. A process for the liquid phase hydrogenation of hydrocarbons of an asphaltic or pitchy character which comprises immersing in the liquid hydrocarbon a pair of electrodes at least one of which is made of a catalytic metal, passing a high frequency current between said electrodes whereby the catalytic metal is dispersed in finely divided form throughout the liquid, contacting hydrogen with the hydrocarbons, simultaneously subjecting the hydrocarbons to cracking conditions of temperature and pressure and utilizing the body of hydrocarbon liquid being hydrogenated as a dispersing medium for catalytic material.

HAROLD C. WEBER.